United States Patent
Cherubini et al.

(10) Patent No.: US 9,506,773 B1
(45) Date of Patent: Nov. 29, 2016

(54) AUTOMATIC NAVIGATION ASSISTANCE BASED ON CALENDAR DATA

(71) Applicant: GOOGLE INC., Mountain View, CA (US)

(72) Inventors: Mauro Cherubini, Zürich (CH); Rajiv Arjan, Streatham Vale (GB)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/313,408

(22) Filed: Jun. 24, 2014

(51) Int. Cl.
*G01C 21/36* (2006.01)

(52) U.S. Cl.
CPC .................................. *G01C 21/362* (2013.01)

(58) Field of Classification Search
CPC .............................................. G01C 21/362
USPC ............................................................. 701/410
See application file for complete search history.

(56) References Cited

U.S. PATENT DOCUMENTS

| | | | |
|---|---|---|---|
| 6,819,256 B2 | 11/2004 | Hampton | |
| 7,212,827 B1 | 5/2007 | Veschl | |
| 7,370,085 B2 | 5/2008 | Brown et al. | |
| 7,839,723 B2 | 11/2010 | Adams | |
| 7,912,480 B2 | 3/2011 | Moosavi et al. | |
| 7,941,753 B2* | 5/2011 | Meisels et al. | 715/751 |
| 8,018,795 B2 | 9/2011 | Adams | |
| 8,086,246 B2 | 12/2011 | Brown et al. | |
| 8,285,206 B2 | 10/2012 | Martin et al. | |
| 8,331,199 B2 | 12/2012 | Adams | |
| 8,380,804 B2 | 2/2013 | Jain et al. | |
| 2003/0224762 A1 | 12/2003 | Lau et al. | |
| 2005/0273493 A1 | 12/2005 | Buford et al. | |
| 2006/0195518 A1 | 8/2006 | Neilsen | |
| 2008/0301567 A1 | 12/2008 | Martin et al. | |
| 2010/0231364 A1 | 9/2010 | Laine et al. | |
| 2010/0295676 A1* | 11/2010 | Khachaturov | G08B 21/24 340/540 |
| 2012/0065882 A1 | 3/2012 | Rogers | |
| 2012/0077463 A1 | 3/2012 | Robbins et al. | |
| 2012/0242482 A1 | 9/2012 | Elumalai et al. | |
| 2013/0073198 A1* | 3/2013 | Coughlin | G01C 21/20 701/465 |
| 2013/0151149 A1* | 6/2013 | Kristinsson et al. | 701/533 |
| 2014/0195469 A1* | 7/2014 | Barrett et al. | 706/46 |

FOREIGN PATENT DOCUMENTS

| | | |
|---|---|---|
| EP | 2228758 A1 | 9/2010 |
| EP | 2388977 A1 | 11/2011 |
| EP | 2642356 A2 | 9/2013 |
| EP | 2665023 A1 | 11/2013 |

* cited by examiner

*Primary Examiner* — Anne M Antonucci

(74) *Attorney, Agent, or Firm* — Birch, Stewart, Kolasch & Birch, LLP

(57) ABSTRACT

Provided are methods and systems for delivering smart reminders to a user based on data associated with a calendar event of the user. The methods and systems utilize data contained in a user's calendar to deliver relevant event location identification information to the user at appropriate times in advance of a scheduled start time for the event. A reminder notification is delivered to a device of the user when it is determined that the user is approaching the specified event location (e.g., based on location data associated with the user device) and the scheduled start time for the event is within a threshold period of time. The notification includes one or more images of a particular venue specified for the event, contact information for the venue, as well as various other data associated with the particular venue and/or corresponding event.

14 Claims, 7 Drawing Sheets

AUTOMATIC NAVIGATION ASSISTANCE BASED ON CALENDAR DATA

BACKGROUND

Existing navigation assistance technology often requires a user's input in order to provide support. For example, with many existing navigation systems the user must declare his or her destination point to receive turn-by-turn navigation instructions. Moreover, the information that may be necessary to complete the navigation support might require separate actions from the user.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The present disclosure generally relates to methods and systems for providing online services to users. More specifically, aspects of the present disclosure relate to providing a user with location identification information based on data associated with corresponding calendar events of the user.

One embodiment of the present disclosure relates to a computer-implemented method comprising: determining that a time-based event associated with a user includes a location for the time-based event; determining that a location of a user device associated with the user is within a predetermined geographical distance of the location for the time-based event and that a scheduled start time for the time-based event is within a threshold period of time; and providing for presentation on a display of the user device a notification for the time-based event, wherein the notification includes information associated with the location for the time-based event.

In accordance with another embodiment, the method further comprises, in response to determining that the scheduled start time for the time-based event is within the threshold period of time, and that the location of the user device associated with the user is outside the predetermined geographical distance of the location for the time-based event, providing for display on the user device navigation information for navigating the user to the location for the time-based event.

In accordance with another embodiment, the notification for the time-based event is in a first format suitable for presentation on the display of the user device, and the method further comprises: determining that a reminder control associated with the event has been modified, wherein the modified reminder control specifies a second format for the notification, the second format being different from the first format; and responsive to determining that the location of the user device is within the predetermined geographical distance of the location for the event, and that the scheduled start time for the time-based event is within the threshold period of time, providing the notification to the user device in the second format.

Another embodiment of the present disclosure relates to a system comprising one or more processors and a non-transitory computer-readable medium coupled to the one or more processors having instructions stored thereon that, when executed by the one or more processors, cause the one or more processors to perform operations comprising: determining that a time-based event associated with a user includes a location for the time-based event; determining that a location of a user device associated with the user is within a predetermined geographical distance of the location for the time-based event and that a scheduled start time for the time-based event is within a threshold period of time; and providing for presentation on a display of the user device a notification for the time-based event, wherein the notification includes information associated with the location for the time-based event.

In accordance with another embodiment, the one or more processors of the system are caused to perform further operations comprising, in response to determining that the scheduled start time for the time-based event is within the threshold period of time and that the location of the user device associated with the user is outside the predetermined geographical distance of the location for the time-based event, providing for display on the user device navigation information for navigating the user to the location for the time-based event.

In accordance with yet another embodiment, the notification for the time-based event is in a first format suitable for presentation on the display of the user device, and the one or more processors of the system are caused to perform further operations comprising: determining that a reminder control associated with the event has been modified, wherein the modified reminder control specifies a second format for the notification, the second format being different from the first format; and responsive to determining that the location of the user device is within the predetermined geographical distance of the location for the event, and that the scheduled start time for the time-based event is within the threshold period of time, providing the notification to the user device in the second format.

Yet another embodiment of the present disclosure relates to one or more non-transitory computer readable media storing computer-executable instructions that, when executed by one or more processors, causes the one or more processors to perform operations comprising: determining that a time-based event associated with a user includes a location for the time-based event; determining that a location of a user device associated with the user is within a predetermined geographical distance of the location for the time-based event and that a scheduled start time for the time-based event is within a threshold period of time; and providing for presentation on a display of the user device a notification for the time-based event, wherein the notification includes information associated with the location for the time-based event.

In accordance with one or more other embodiments, the methods and systems described herein may optionally include one or more of the following additional features: the time-based event is a calendar event; the information associated with the location for the time-based event includes an image of the location for the time-based event; the image of the location for the time-based event is a view of the location for the time-based event from the perspective of the user based on the determined location of the user device; the information associated with the location for the time-based event includes multiple images of the location for the time-based event, each of the images showing a different view of the location from different perspectives of the user based on the determined location of the user device; the threshold period of time is based on an indicated preference of the user; and/or the predetermined geographical distance is based on an indicated preference of the user.

Further scope of applicability of the present disclosure will become apparent from the Detailed Description given below. However, it should be understood that the Detailed Description and specific examples, while indicating preferred embodiments, are given by way of illustration only, since various changes and modifications within the spirit and scope of the disclosure will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

Figure 1:
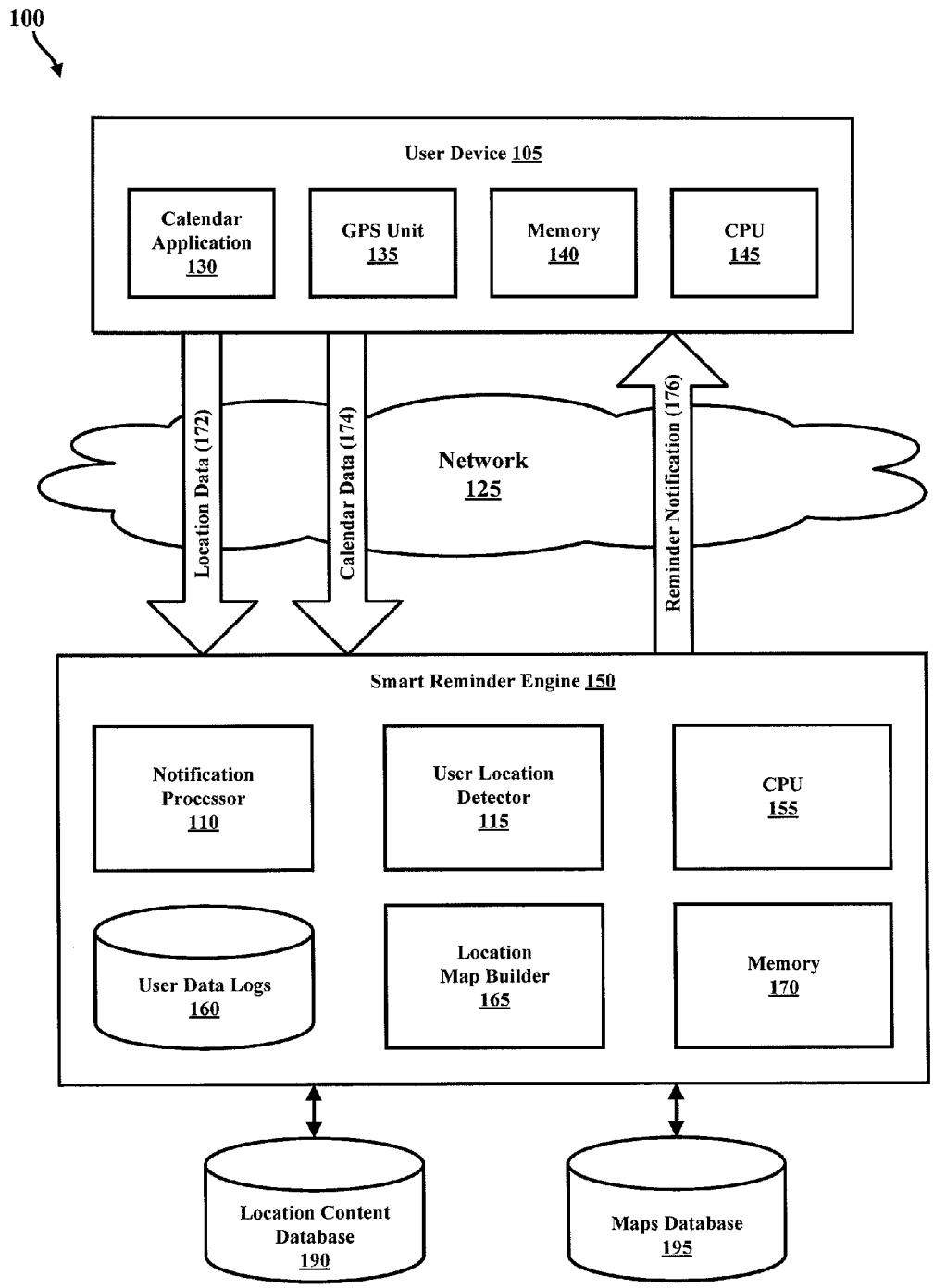
FIG. 1 is a block diagram illustrating an example system for providing location identification information to a user based on data associated with corresponding calendar events according to one or more embodiments described herein.

The headings provided herein are for convenience only and do not necessarily affect the scope or meaning of what is claimed in the present disclosure.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples and embodiments will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include many other obvious features not described in detail herein. Additionally, some well-known structures or functions may not be shown or described in detail below, so as to avoid unnecessarily obscuring the relevant description.

The present disclosure envisions a future where information technology (IT) systems require minimal to no interaction with a user in order to provide assistive support. Such technological advancements are possible because many signals about the user's behavior are available in the ecosystem of digital systems, and these signals could be used (provided the user's consent) to deliver numerous useful services. As will be described in greater detail herein, electronic calendars are one source of signals that may be utilized to predict a user's intentions and future activities. Taking these signals into proper account can lead to the design of innovative services that can support, for example, navigation assistance.

Embodiments of the present disclosure relate to methods and systems for providing a user with information relevant to a location of a time-based event associated with a web application of the user (e.g., a calendar application). As will be further described below, the methods and systems of the present disclosure utilize data contained in the web application to deliver relevant location identification information to the user at appropriate times. For a time-based event (e.g., calendar event, task, etc.) for which the user has specified a location, the methods and systems described herein may deliver a "smart" reminder to the user (e.g., to a portable device of the user, such as, for example, a cellular telephone, smartphone, etc.) when the user is approaching the location. In accordance with at least one embodiment described herein, a reminder (e.g., notification, alert, message, etc.) may be delivered to the user's device at a time that the user is expected to be approaching the specified location based on the scheduled time for the corresponding event.

In accordance with one or more embodiments of the present disclosure, calendar data, location data, and/or various other data associated with a user may be utilized to provide the user with relevant location information corresponding to an event scheduled for the user (e.g., in the user's online calendar application or the like). Such calendar data and/or location data associated with the user may be received (e.g., at a smart reminder engine, such as smart reminder engine 150 in the example system 100 shown in FIG. 1, which will be described in greater detail below) from any one or more of a variety of user devices of the user (e.g., belonging to, authorized for use by, or otherwise associated with the user), and reminder notifications may be provided to any one or more of the same or different such user devices for presentation to the user (e.g., for presentation on a display of any such devices). Some non-limiting examples of such user devices include laptop computers, tablet computing devices, mobile telephones, smartphones, wearable user computing devices (e.g., wristwatch or glasses configured as computing devices), as well as numerous other types or variations of such devices similar in nature and/or functionality.

In describing various embodiments and features of the present disclosure, reference is sometimes made to calendar or location data "received from a user" and reminder notifications "provided to a user." It should be understood that in the implementation context, data and/or notifications "received from a user" or "provided to a user" means data and/or notifications received from/provided to a device of a user (a "user device"), the device being configured for operation or use by the user. As such, "data received from a user" and "data received from a user device", as well as "notifications provided to a user" and "notifications provided to a user device", may be used interchangeably at times for purposes of simplicity.

Additionally, one or more examples provided herein describe delivering a "smart reminder" to a user based on data associated with a calendar event of the user. It should be noted that the term "smart reminder" is not in any way intended to limit the scope of the present disclosure. Rather, this term is used herein to collectively describe numerous types of notifications, alerts, messages, etc., that may be automatically generated (e.g., provided that a corresponding feature or setting is enabled by the user, or a user preference has been selected or designated by the user) for an event associated with the user for which a location has been specified, and provided to the user at a time determined to be convenient and useful to the user. It should also be understood that, in accordance with one or more embodiments described herein, a calendar event associated with the user may be any time-based event associated with the user, and is not limited to an event scheduled only in a user's calendar application. For example, a smart reminder may be provided to a user for a task assigned to the user and stored in a task list associated with the user.

It should also be noted that in situations in which the systems and methods described herein may collect personal information about users, or may make use of personal information, the users may be provided with an opportunity to control whether programs or features associated with the systems and/or methods collect user information (e.g., information about a user's preferences, a current location of a device associated with the user, information about the user's social actions or activities, and the like). Users may also be provided with an opportunity to control whether and/or how to receive content (e.g., notifications, such as "smart reminders", as well as various information contained in or connected with such notifications) from servers associated with the systems and methods of the present disclosure. In addition, certain data may be treated in one or more ways before it is stored or used, so that personally identifiable information is removed. For example, a user's identity may be treated so that no personally identifiable information can be determined for the user. Thus, the user may have control over how information is collected about the user and used by a server (e.g., smart reminder engine 150, which will be described in greater detail below with respect to the example system illustrated in FIG. 1).

FIG. 1 is a block diagram illustrating an example system for providing event location information to a user based on data associated with corresponding calendar events according to one or more embodiments described herein. For example, the system 100 may provide the user with a variety of location identification information relevant to a particular event for which a location has been specified.

In accordance with at least one embodiment, the system 100 may include a smart reminder engine 150 in communication with a user device 105 over a network 125 (e.g., the Internet). The smart reminder engine 150 may receive (e.g., retrieve, request, collect, or otherwise obtain) location data 172 and calendar data 174 from the user device 105, and may provide to the user device 105 a reminder notification 176. Additional details about the location data 172, calendar 174, and notification 176 will be described below. In accordance with at least one embodiment, the smart reminder engine 150 may include a notification processor 110, a user location detector 115, CPU 155, memory 170, location map builder 165, and one or more user data logs 160. In addition, the smart reminder engine 150 may be configured to access one or more databases such as, for example, location content database 190 and maps database 195.

An event that is scheduled in a calendar application 130 of the user (e.g., an event that is accepted or tentatively accepted in a calendar web application 130 utilized by the user) may include a variety of data associated with the event (calendar data 174). For example, a calendar event may include data about an intended start time of the event, a location (e.g., a building or other type of venue) at which the event is to take place, a subject or purpose of the event (e.g., what is involved in the event), identities of one or more users invited to attend the event, and the like. In accordance with one or more embodiments described herein, such calendar event data 174 associated with the user may be used to generate a notification (e.g., reminder message) 176 that is provided to a user device 105 of the user upon the occurrence of a condition. For example, the notification 176 may be provided to the user device 105 in response to a determination that the user device 105 is within a certain geographical distance (e.g., within one-half of a mile, within one-hundred yards, etc.) of the location specified for the event. In another example, the notification 176 may be provided to the user device 105 in response to a determination that a scheduled start time for the event is within a threshold period of time (e.g., within five minutes of the current time). In yet another example, the notification 176 may be provided to the user device 105 in response to a determination that the user device 105 is within a predetermined geographical distance of the location for the event and also that a scheduled start time for the event is within a threshold period of time. The geographical distance, the threshold period of time, or both, may be predetermined or preset in accordance with, for example, one or more indicated preferences of the user or default settings associated with the calendar application 130.

In addition, in accordance with at least one embodiment, in response to a determination that the scheduled start time for an event is within a threshold period of time, but the location of the user device 105 is determined to be outside of a predetermined geographical distance of the location specified for the event, navigation information may be provided to the user (e.g., displayed on user device 105). Such navigation information may be used, for example, to navigate the user to the location specified for the event. Once it is determined that the user device 105 is within the predetermined geographical distance of the location specified for the event, notification 176 may then be provided to the user device 105.

As will be described in greater detail herein, the location of a user may be determined (or approximated) using any of a variety of techniques and/or devices known in the art. For example, in accordance with at least one embodiment, a user's location may be determined based on location data 172 acquired or obtained by a global position system (GPS) 135 associated with a device of the user (e.g., user device 105), such as the user's mobile telephone, tablet computer, various wearable technologies or devices (e.g., articles of clothing or accessories incorporating or embedded with a computer and/or other electronic technologies, such as, for example, a wrist watch, glasses, etc.), and the like.

In accordance with one or more embodiments of the present disclosure, the generation of a smart reminder (e.g., notification 176) may begin when the user creates or accepts (e.g., either definitively or tentatively accepts) a calendar event that includes location information for the event. This smart reminder may be stored on the user device 105 (e.g., in memory 140 of user device 105) until it is provided for presentation to the user (e.g., on a display of the user device 105 (not shown)). Prior to being provided to the user, the notification 176 may also be updated in response to, for example, a change or modification to the corresponding calendar event and/or a change to a location associated with the calendar event.

Prior to the notification 176 being provided to the user (e.g., prior to the conditions being met to trigger the sending/presenting of the notification 176 to the user), a reminder control associated with the corresponding calendar event may be disabled or deactivated such that the notification 176 is not provided to the user. In accordance with at least one embodiment, the reminder control associated with the corresponding calendar event may be modified (instead of being disabled or deactivated) such that the notification 176 is provided to the user in a different manner than originally or previously specified. For example, a user may initially activate and configure the reminder control associated with a calendar event so that a notification (e.g., reminder notification 176) will be provided to the user in a first format (e.g., as an alert appearing in an alert window overlaid on a display of the user device 105), and at some later time reconfigure the reminder control so that the notification will be provided to the user in second format different from the first format (e.g., as an e-mail, SMS message, etc.).

In accordance with at least one embodiment, the notification that may be provided to the user may be a multimedia message containing a variety of information relevant to the specified location associated with the event. For example, the notification (e.g., reminder notification (176) in the example system 100 shown in FIG. 1) may include an image of the particular venue specified in the event (e.g., a "street view" image of the venue location), a visual layout of the venue (e.g., building layout), contact information for the venue (e.g., telephone and/or fax number, e-mail address, etc.), which may include one or more options for initiating such contact with the venue, as well as various other data associated with the particular venue and/or corresponding event. In accordance with at least one embodiment, the imagery of the venue that may be included in the notification may be customized to represent or mimic the actual point-of-view of the user at the moment the user is receiving the notification.

The notification (176) provided to the user device 105 may be in the form of text, images, videos, audio files, as well as content combining one or more of any such forms. The notifications (176) may be provided to the user device 105 (e.g., presented to the user on a display of the user device 105) in electronic form, such as banner or pop-up notifications (e.g., which may overlay a portion of content presently displayed on the user device), notifications provided in a user interface associated with an application (e.g., a third-party application running on the user device), notifications provided as e-mail or SMS messages, and the like. Such notifications (176) may also include embedded information or data, including links to other electronic content (e.g., web pages, images, audio files, video files, etc.), meta-information, and/or machine-executable instructions.

It should be noted that, in accordance with one or more embodiments described herein, the methods and systems for providing a user with location identification information corresponding to a calendar event of the user may include one or more other optional features. For example, due to constraints on battery life for particular user devices, if navigation support is available for a particular user then such a feature may remain inactive until a predetermined period of time (e.g., thirty minutes, ten minutes, etc.) prior to the scheduled start time for a calendar event. This predetermined period of time may be modified by a user according to individual preferences. For example, as will be described in greater detail below, in accordance with at least one embodiment the monitoring of the user's location (e.g., of the user device's location) may begin a predetermined period of time prior to the scheduled start time for the event in order to, for example, preserve battery life of the device.

In addition, in a case where a user is determined to have limited or no access to the Internet while navigating to the location specified in the calendar event, the relevant information (e.g., imagery data, contact information, etc.) about the location may be fetched (e.g., retrieved, requested, or otherwise obtained) at the time the event is created or scheduled (e.g., cached) and displayed offline to the user at a time when the user is expected to be approaching the location. For example, it may be determined, based on data about the location specified for the event (e.g., data stored in location content database 190, data stored in maps database 195, or both, in the example system 100 shown in FIG. 1), that communication with the user's device will be limited at or within a certain proximity of the specified location. In such a scenario, the relevant information (e.g., imagery data, contact information, etc.) about the specified location may be stored on the user's device (e.g., in memory 140 of user device 105) and used to generate and provide notification 176 for display to the user in response to a determination that a scheduled start time for the event is within a threshold period of time (e.g., within the next 5 minutes, 10 minutes, etc.). Again, this threshold period of time may be based on, for example, an indicated preference of the user, a default setting associated with the calendar application 130, or some other criterion associated with the particular event and/or the reminder control for the event.

Figure 2:
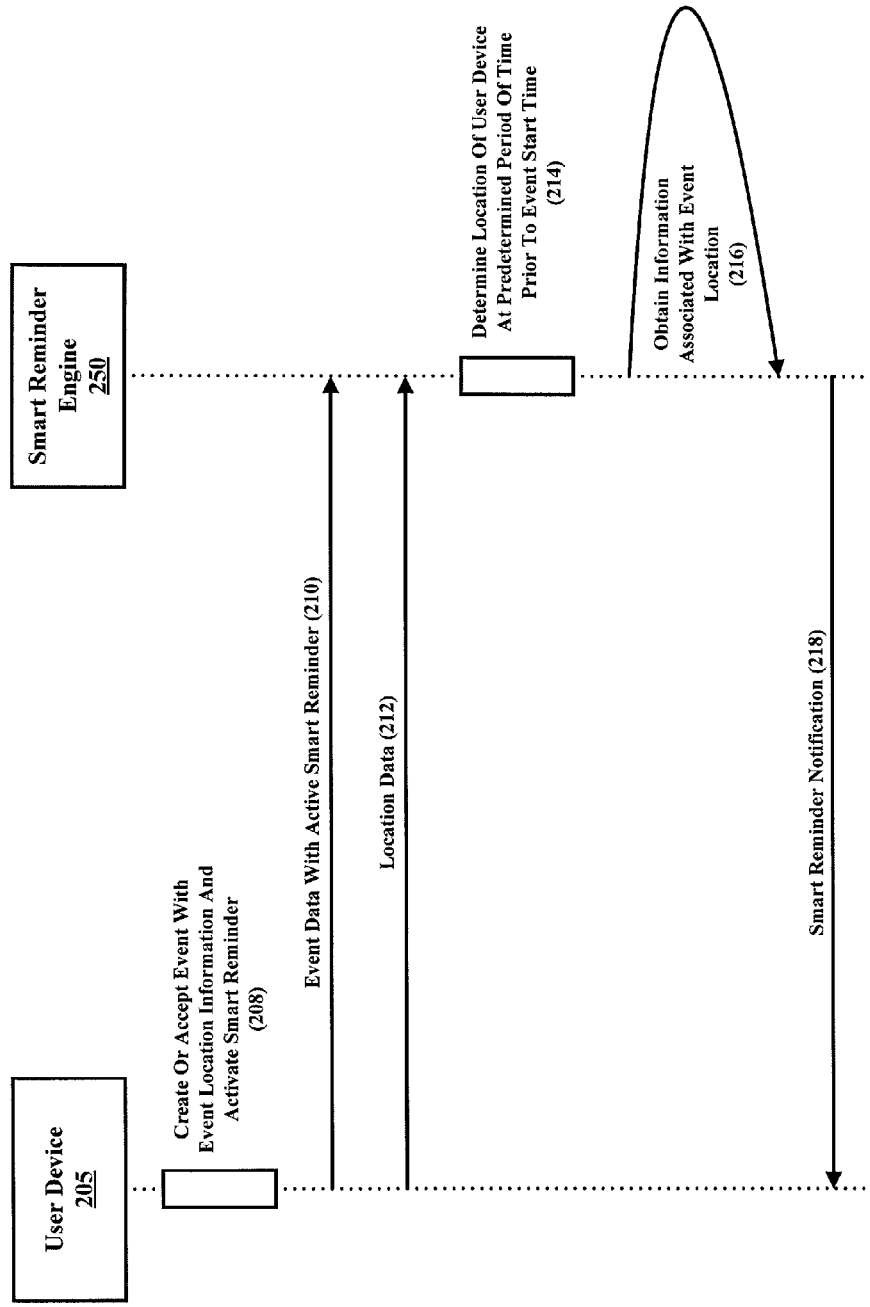
FIG. 2 is a schematic diagram illustrating example data flows between components of a system for providing location identification information to a user based on data associated with corresponding calendar events according to one or more embodiments described herein.

FIG. 2 illustrates example data flows between components of a system for generating and providing location identification information to a user based on data associated with corresponding calendar events according to one or more embodiments described. In accordance with at least one embodiment, the example components (e.g., user device 205 and smart reminder engine 250) and data flows between the components illustrated in FIG. 2 may be similar to corresponding components and data flows illustrated in FIG. 1 and described in detail above.

A user associated with user device 205 may create, accept, or otherwise schedule an event in the user's calendar (208), where the scheduled event specifies a location for the event and also has an active smart reminder associated with it. For example, in accordance with at least one embodiment described herein, when a user creates an event or accepts an invite to an event created by another, the user may have the option of activating a smart reminder control for the event. The user device 205 may send data associated with the event (210) (e.g., calendar data 174 in the example system 100 shown in FIG. 1), which may include data indicating that the smart reminder has been activated for the event, to the smart reminder engine 250. The user device 205 may also send location data (212) (e.g., location data 172 in the example system 100 shown in FIG. 1) about a location of the user device 205 to the smart reminder engine 250. It should be understood that in accordance with one or more embodiments described herein, the event data (210) and/or location data (212) may be retrieved, collected, fetched, or otherwise obtained by the smart reminder engine 250 from the user device 205 without the user device 205 having to actively take steps to provide such data.

At some predetermined period of time prior to the scheduled start time for the event, the smart reminder engine 250 may begin monitoring the location (214) of the user device 205. For example, the smart reminder engine 250 may monitor the location (214) of the user device 205 based on the received location data (212) for the user device 205 (e.g., user location detector 115 may monitor the location of user device 105 based on location data 172 acquired by GPS unit 135 in the example system 100 shown in FIG. 1).

The smart reminder engine 250 may obtain (214) various information associated with the location specified for the event. In accordance with at least one embodiment, the smart reminder engine 250 may utilize the event data (210) to obtain, for example, relevant identifying information (e.g., imagery data, contact information, etc.) about the specified event location (e.g., information obtained from location content database 190 and/or utilized by location map builder 165 in the example system 100 shown in FIG. 1). The relevant information about the event location obtained (214) by the smart reminder engine 250 may be used to generate a smart reminder notification (218) that is provided to the user device 205 to, for example, assist the user with identifying the specified location.

For example, the smart reminder notification (218) may be generated by the smart reminder engine 250 and provided to the user device 205 in response to a determination by the smart reminder engine 250 (e.g., by user location detector 115 and data from maps database 195 in the example system 100 shown in FIG. 1) that the user device 205 is within a certain geographical distance (e.g., one-half of a mile, one-hundred yards, etc.) of the location specified for the event. In accordance with at least one other embodiment, the smart reminder notification (218) may be generated by the smart reminder engine 250 and provided to the user device 205 in response to a determination that a scheduled start time for the event is within a threshold period of time, which may be based on, for example, an indicated preference of the user or a default setting associated with the corresponding calendar application (e.g., calendar application 130).

Figure 3:
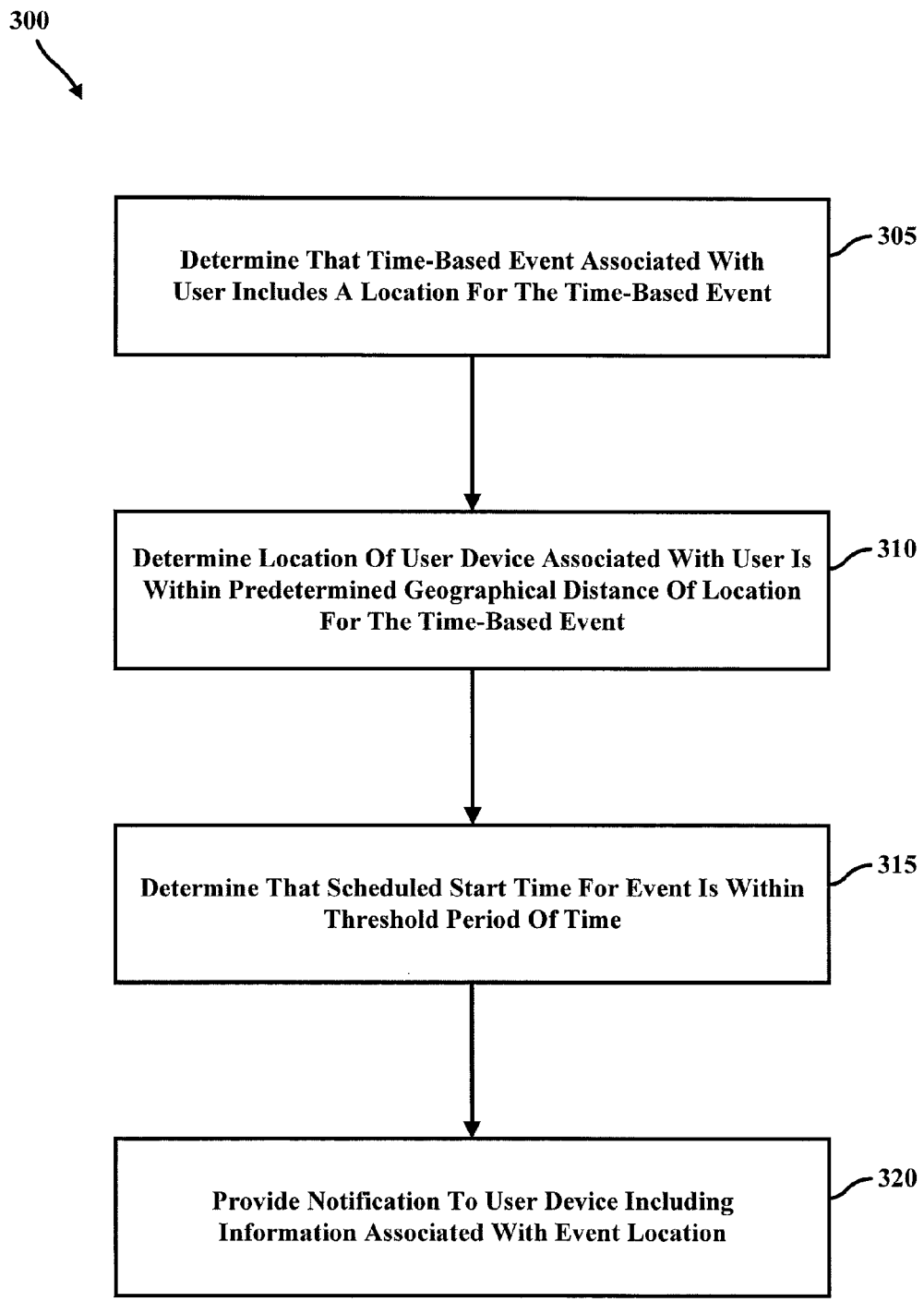
FIG. 3 is a flowchart illustrating an example method for delivering location identification information to a user for a calendar event based on a determined location of a device associated with the user and a scheduled start time for the calendar event according to one or more embodiments described herein.

FIG. 3 illustrates an example process for generating and providing (e.g., delivering, serving, sending, etc.) location identification information (e.g., smart reminder) to a user for a scheduled event (e.g., calendar event) of the user based on a determined location of the user (a determined or monitored location of a user device associated with the user) and a scheduled start time for the event. In accordance with one or more embodiments described herein, the example process 300 may be performed by a notification generation and delivery system similar to system 100 described above and illustrated in FIG. 1.

At block 305, a determination may be made that a time-based event (e.g., calendar event) associated with the user includes (e.g., specifies or identifies) a location for the time-based event. For example, it may be determined that an event scheduled in the user's calendar (e.g., calendar application 130 in the example system 100 shown in FIG. 1) includes data about a location for the event.

At block 310, a determination may be made that a location of a user device associated with the user is within a predetermined geographical distance (e.g., within one-half of a mile, within one-hundred yards, etc.) of the location for the time-based event. In accordance with at least one embodiment, the determination at block 310 may be made based on a monitored location of the user device and various data or information associated with the location included in the time-based event (e.g., data and information obtained from location content database 190 and/or utilized by location map builder 165 in the example system 100 shown in FIG. 1). For example, the location of the user device may be determined at block 310 by monitoring location data received for the user device (e.g., location data 172 acquired by GPS unit 135, received at smart reminder engine 150, and used for monitoring the location of the user device 105 by user location detector 115 in the example system 100 shown in FIG. 1). In accordance with one or more other embodiments, the monitoring of the location of the user device at block 315 may begin at some predetermined period of time (e.g., one hour, thirty minutes, etc.) prior to the scheduled start time for the event.

At block 315, a determination may be made that a scheduled start time for the time-based event is within a threshold period of time. For example, it may be determined at block 315 that the time-based event associated with the user is scheduled to start within the next fifteen minutes, ten minutes, etc. In accordance with one or more embodiments described herein, the threshold period of time may be based on, for example, an indicated preference of the user, a default setting associated with a calendar application of the user (e.g., calendar application 130 installed on user device 105 in the example system 100 shown in FIG. 1), or some other criterion associated with the particular event and/or a reminder control associated with the event (as further described below).

In response to the determination (at block 310) that the location of the user device associated with the user is within the predetermined geographical distance of the location for the time-based event, and also the determination (at block 315) that the scheduled start time for the time-based event is within the threshold period of time, at block 320 a notification for the time-based event may be provided to the user device. In accordance with at least one embodiment, the notification (e.g., notification 176 provided to user device 105 in the example system 100 shown in FIG. 1) that may be sent to the user device at block 320 may include various information associated with the location specified for the time-based event. For example, the notification may include relevant identifying information (e.g., imagery data, contact information, etc.) about the event location to assist the user in identifying the actual physical location (e.g., building, landmark, other venue, etc.) for the event. The notification provided to the user device at block 320 may be provided in a format suitable for presentation on a display of the user device.

Although not included in the example process 300 shown in FIG. 3, in accordance with one or more embodiments, a determination may also be made that a reminder control associated with the event is active (e.g., in an active state, enabled, etc.). For example, an event scheduled in a user's calendar (e.g., calendar application 130 installed on user device 105 in the example system 100 shown in FIG. 1) may have a reminder control (e.g., setting, option, etc.) associated with the event, where the reminder control may be selectively activated/deactivated (enabled/disabled) by the user. Whether the event was created by the user, or the user accepted an invite to the event created by another, the user may have the option of toggling on/off the reminder control for the event.

Furthermore, in accordance with at least one embodiment, in addition to or instead of determining that the reminder control associated with the event is active, a determination may be made that the reminder control associated with the event has been modified with respect to one or more characteristics/features of the notification (e.g., notification 176 in the example system 100 shown in FIG. 1) to be generated when the control is in an active state. For example, it may be determined that the reminder control associated with the event has been modified such that the notification is to be provided to the user in a different manner than originally or previously specified. For example, a user may initially activate and configure the reminder control associated with the event so that a notification will be provided to the user in a first format (e.g., as an alert appearing in an alert window overlaid on a display of the user device 105), and at some later time reconfigure the reminder control so that the notification will be provided to the user in second format different from the first format (e.g., as an e-mail, SMS message, etc.).

Figure 4:
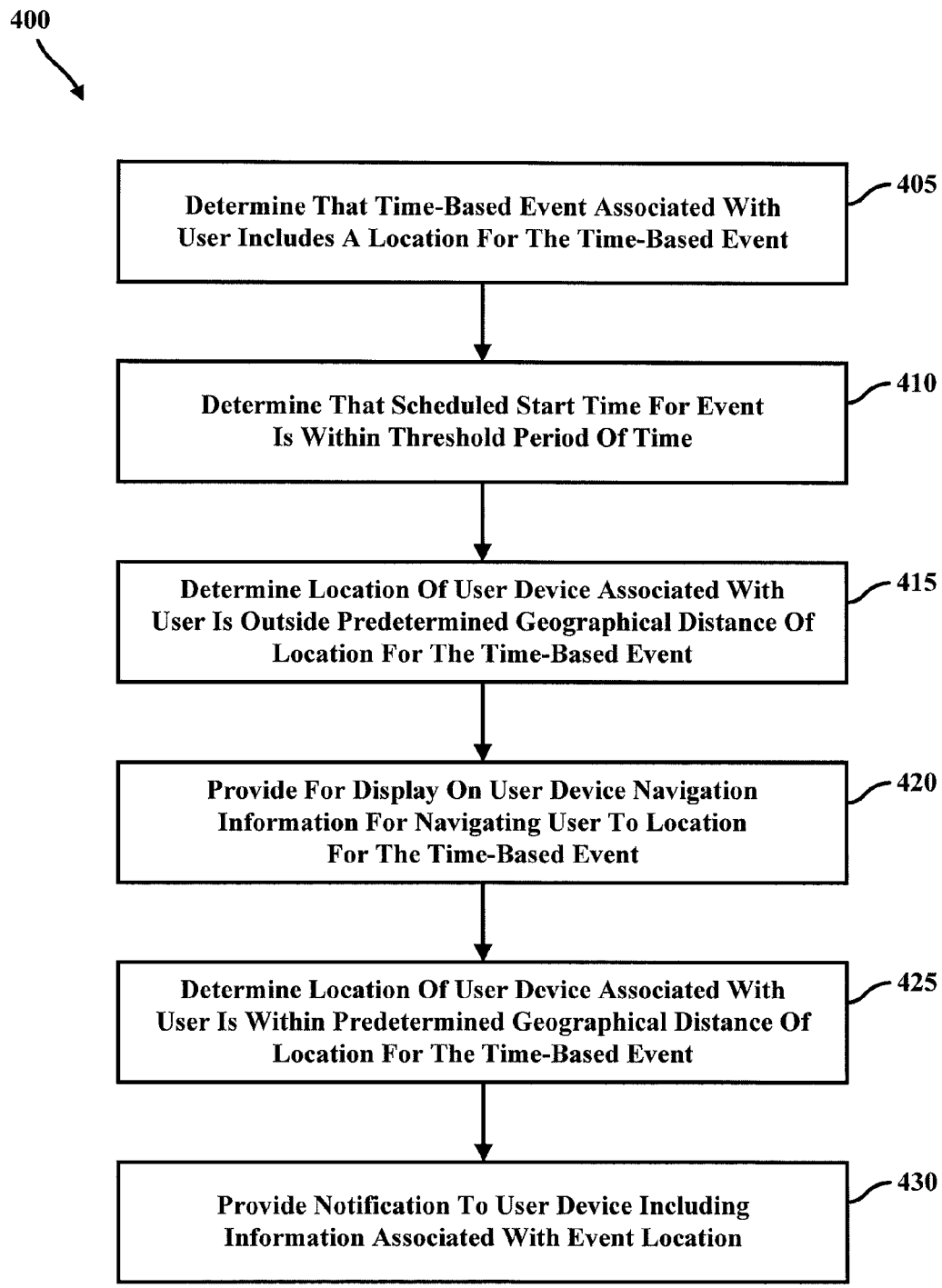
FIG. 4 is a flowchart illustrating an example method for delivering navigation information and location identification information to a user for a calendar event based on a determined location of a device associated with the user and a scheduled start time for the calendar event according to one or more embodiments described herein.

FIG. 4 is a flowchart illustrating an example process for generating and providing (e.g., delivering, serving, sending, etc.) navigation information for a location of a time-based event associated with the user, and also a smart reminder notification (e.g., notification 176 in the example system 100 shown in FIG. 1) for the event based on a location of the user (a determined or monitored location of a user device associated with the user) and a specified start time for the event. In accordance with one or more embodiments described herein, the example process 400 may be performed by a notification generation and delivery system similar to system 100 described above and illustrated in FIG. 1.

At block 405, a determination may be made that a time-based event (e.g., calendar event) associated with the user includes (e.g., specifies or identifies) a location for the time-based event. For example, it may be determined that an event scheduled in the user's calendar (e.g., calendar application 130 in the example system 100 shown in FIG. 1) includes data about a location for the event.

At block 410, a determination may be made that a scheduled start time for the time-based event is within a threshold period of time. For example, it may be determined at block 410 that the time-based event associated with the user is scheduled to start within the next fifteen minutes, ten minutes, etc. In accordance with one or more embodiments described herein, the threshold period of time may be based on, for example, an indicated preference of the user, a default setting associated with a calendar application of the user (e.g., calendar application 130 installed on user device 105 in the example system 100 shown in FIG. 1), or some other criterion associated with the particular event and/or a reminder control associated with the event (as further described below).

At block 415, a determination may be made that a location of a user device associated with the user is outside of a predetermined geographical distance (e.g., within one-half of a mile, within one-hundred yards, etc.) of the location for the time-based event. In accordance with at least one embodiment, the determination at block 415 may be made based on a monitored location of the user device and various data or information associated with the location included in the time-based event (e.g., data and information obtained from location content database 190 and/or utilized by location map builder 165 in the example system 100 shown in FIG. 1). For example, the location of the user device may be determined at block 415 by monitoring location data received for the user device (e.g., location data 172 acquired by GPS unit 135, received at smart reminder engine 150, and used for monitoring the location of the user device 105 by user location detector 115 in the example system 100 shown in FIG. 1). In accordance with one or more other embodiments, the monitoring of the location of the user device at block 410 may begin at some predetermined period of time (e.g., one hour, thirty minutes, etc.) prior to the scheduled start time for the time-based event.

In response to the determination (at block 410) that the scheduled start time for the time-based event is within the threshold period of time, and the determination (at block 415) that the location of the user device associated with the user is outside of the predetermined geographical distance of the location for the time-based event, at block 420 navigation information may be provided to the user (e.g., displayed on user device 105). In accordance with at least one embodiment, such navigation information may be provided to the user at block 420 to navigate the user to the location specified for the time-based event.

Once it is determined (at block 425) that the user device is within the predetermined geographical distance of the location for the time-based event, at block 430 a notification (which may be similar to the notification provided to the user at block 320 in the example process 300 illustrated in FIG. 3 and described above) may then be provided to the user device. In accordance with at least one embodiment, the notification (e.g., smart reminder notification 176 in the example system 100 shown in FIG. 1) that may be provided to the user device at block 430 may include a variety of information associated with the location specified for the time-based event. For example, the notification may include relevant identifying information (e.g., imagery data, contact information, etc.) about the specified event location to assist the user in identifying the actual physical location (e.g., building, landmark, other venue, etc.) for the event.

Although not included in the example process 400 shown in FIG. 4 (similar to the example process 300 described above and illustrated in FIG. 3), in accordance with one or more embodiments, a determination may also be made that a reminder control associated with the event is active (e.g., in an active state, enabled, etc.). For example, an event scheduled in a user's calendar (e.g., calendar application 130 installed on user device 105 in the example system 100 shown in FIG. 1) may have a reminder control (e.g., setting, option, etc.) associated with the event, where the reminder control may be selectively activated/deactivated (enabled/disabled) by the user. Whether the event was created by the user, or the user accepted an invite to the event created by another, the user may have the option of toggling on/off the reminder control for the event.

In accordance with at least one embodiment, in addition to or instead of determining that the reminder control associated with the event is active, a determination may be made that the reminder control associated with the event has been modified with respect to one or more characteristics/features of the notification (e.g., notification 176 in the example system 100 shown in FIG. 1) to be generated when the control is in an active state. For example, it may be determined that the reminder control associated with the event has been modified such that the notification is to be provided to the user in a different manner than originally or previously specified. For example, a user may initially activate and configure the reminder control associated with the event so that a notification will be provided to the user in a first format (e.g., as an alert appearing in an alert window overlaid on a display of the user device 105), and at some later time reconfigure the reminder control so that the notification will be provided to the user in second format different from the first format (e.g., as an e-mail, SMS message, etc.).

Figure 5:
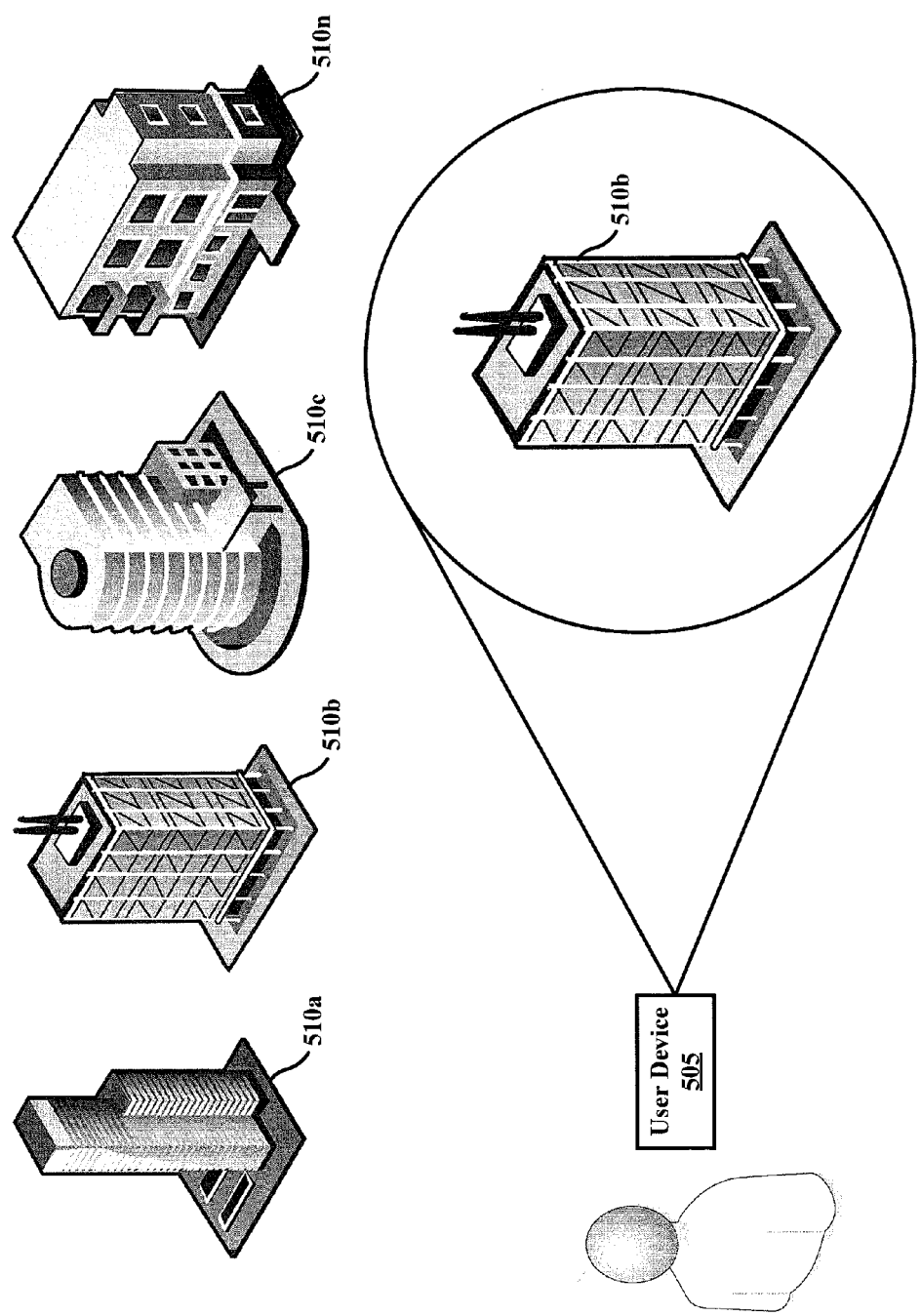
FIG. 5 is a schematic diagram illustrating an example of a component of a smart reminder notification provided for presentation on a user device according to one or more embodiments described herein.

FIG. 5 illustrates an example of a component of a smart reminder notification that may be provided to a user (e.g., provided for presentation on a display of a user device 505 associated with the user) for an event associated with a calendar of the user where an event location has been specified and where a smart reminder control (e.g., reminder control) has been activated for the event. In accordance with at least one embodiment described herein, the smart reminder notification (e.g., notification 176 in the example system 100 shown in FIG. 1) provided to the user device 505 may include an image of the location 510b specified for the event so as to assist the user in identifying the specified location 510b among other locations 510a, 510c, 510n (where "n" is an arbitrary number) in the same vicinity.

Figure 6:
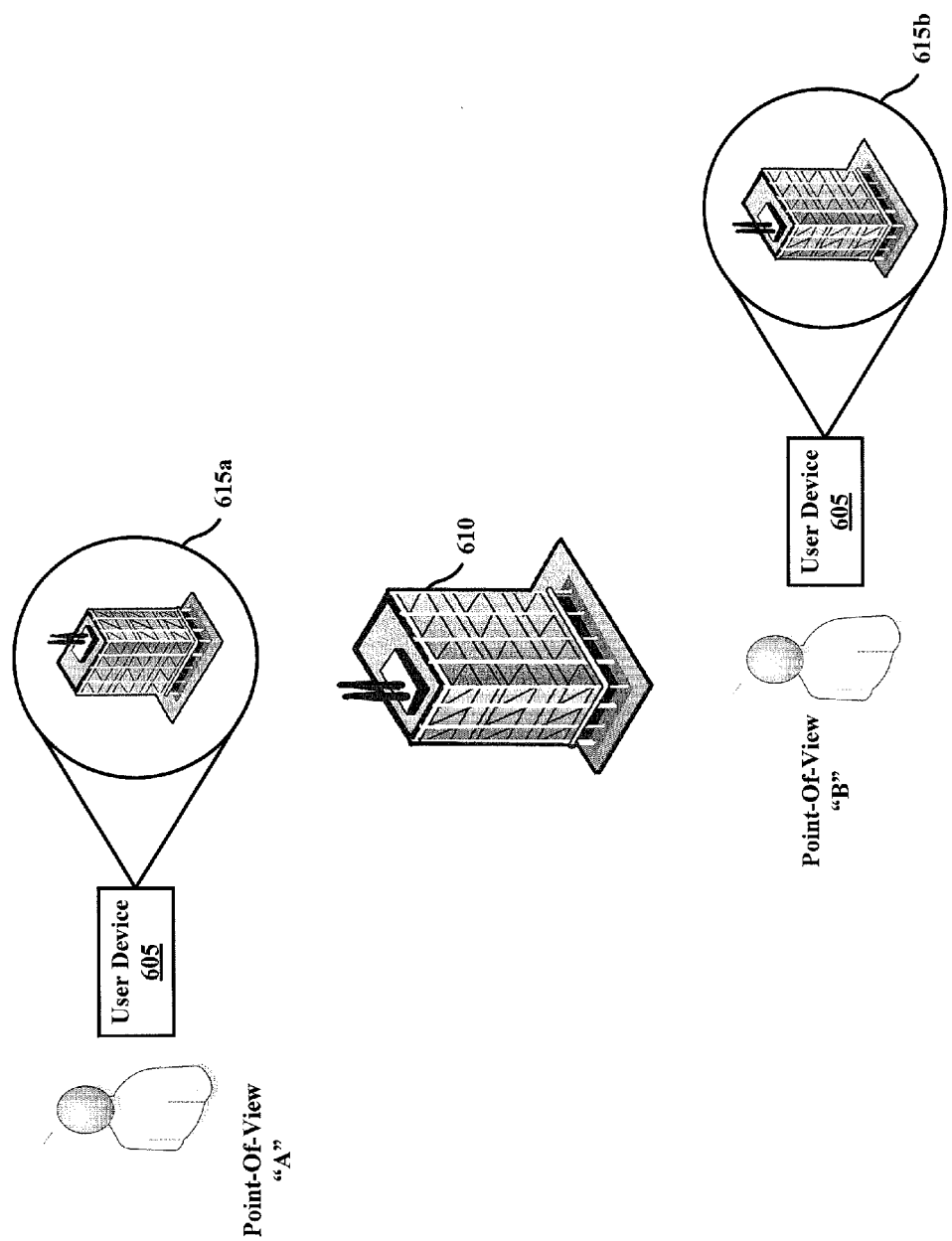
FIG. 6 is a schematic diagram illustrating example components of smart reminder notifications provided for presentation on a user device based on a point-of-view of the user according to one or more embodiments described herein.

FIG. 6 also illustrates example components of smart reminder notifications that may be provided to a user for an event associated with a calendar of the user where an event location has been specified and where a smart reminder control (e.g., reminder control) has been activated for the event. In accordance with at least one embodiment of the present disclosure, the smart reminder notification (e.g., notification 176 in the example system 100 shown in FIG. 1) provided for display on the user device 605 may include an image of the location 610 specified for the event, where the image provided corresponds to a determined point-of-view of the user with respect to the location. For example, where it is determined (e.g., based on location data obtained for the user device 605) that the user is approaching the specified event location 610 from a first point-of-view (point-of-view "A"), the smart reminder notification provided to the user may include an image 610a of the location that corresponds to that first point-of-view. Similarly, where it is determined that the user is approaching the specified event location 610 from a second point-of-view (point-of-view "B", which is different than point-of-view "A"), the smart reminder notification provided to the user may include an image 610b of the location that corresponds to that second point-of-view. In this manner, the smart reminder notification provided to the user includes information (e.g., imagery) that is helpful to the user in identifying the specified event location.

Figure 7:
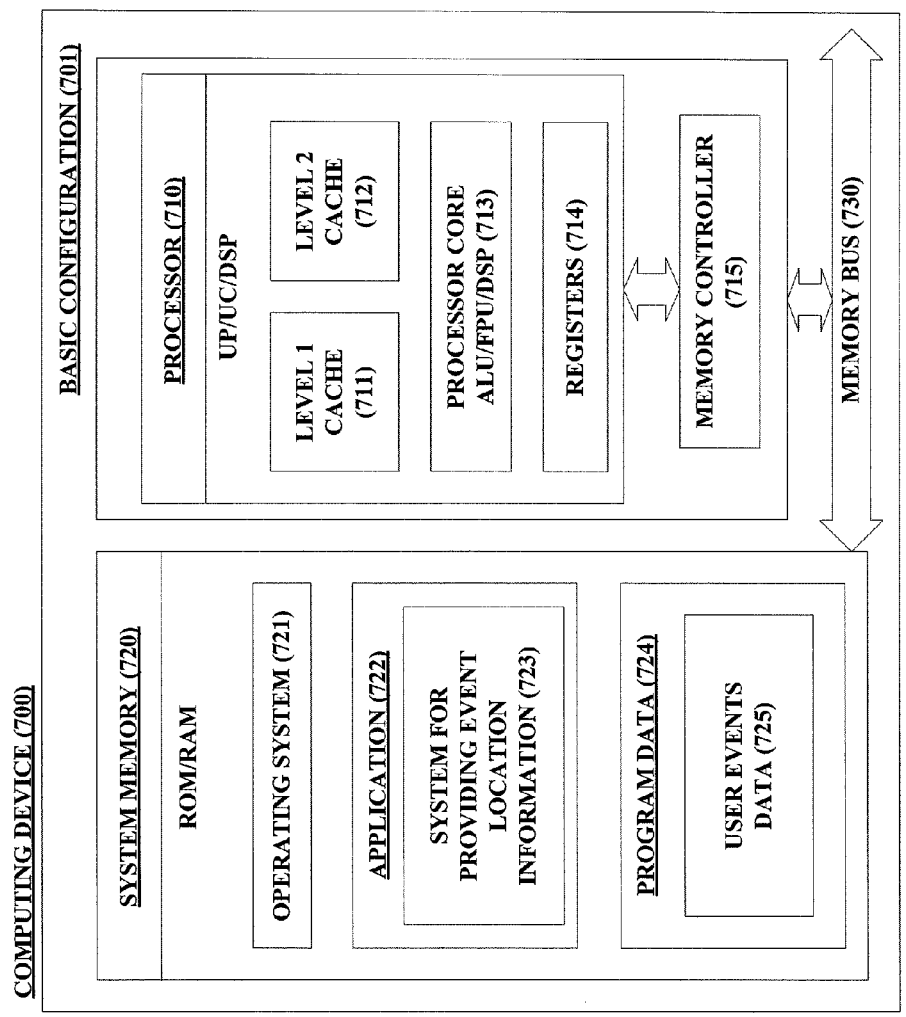
FIG. 7 is a block diagram illustrating an example computing device arranged for delivering location identification information to a user based on data associated with corresponding calendar events according to one or more embodiments described herein.

FIG. 7 is a high-level block diagram of an exemplary computer (700) that is arranged for providing location identification information to a user based on data associated with corresponding calendar events according to one or more embodiments described herein. In a very basic configuration (701), the computing device (700) typically includes one or more processors (710) and system memory (720). A memory bus (730) can be used for communicating between the processor (710) and the system memory (720).

Depending on the desired configuration, the processor (710) can be of any type including but not limited to a microprocessor (µP), a microcontroller (µC), a digital signal processor (DSP), or any combination thereof. The processor (710) can include one more levels of caching, such as a level one cache (711) and a level two cache (712), a processor core (713), and registers (714). The processor core (713) can include an arithmetic logic unit (ALU), a floating point unit (FPU), a digital signal processing core (DSP Core), or any combination thereof. A memory controller (715) can also be used with the processor (710), or in some implementations the memory controller (715) can be an internal part of the processor (710).

Depending on the desired configuration, the system memory (720) can be of any type including but not limited to volatile memory (such as RAM), non-volatile memory (such as ROM, flash memory, etc.) or any combination thereof. System memory (720) typically includes an operating system (721), one or more applications (722), and program data (724). The application (722) may include a system (e.g., system 100 as shown in the example of FIG. 1) for providing event location information (723) to a user (e.g., to a user device) based on data associated with corresponding calendar events of the user (e.g., as obtained from a calendar web application utilized by the user) according to one or more embodiments described herein. Program Data (724) may include storing instructions that, when executed by the one or more processing devices, implement a system and method for providing location identification information to a user based on data associated with corresponding calendar events according to one or more embodiments described herein. Additionally, in accordance with at least one embodiment, program data (724) may include user calendar events data (725), which may relate to events scheduled in a calendar web application for the user. In some embodiments, the application (722) can be arranged to operate with program data (724) on an operating system (721).

The computing device (700) can have additional features or functionality, and additional interfaces to facilitate communications between the basic configuration (701) and any required devices and interfaces.

System memory (720) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of the device (700).

The computing device (700) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (700) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location).

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
   determining, at a server, that a time-based event associated with a user includes a location for the time-based event;
   determining a location of a user device associated with the user;
   determining, at the server, whether the location of the user device associated with the user is within a predetermined geographical distance of the location for the time-based event and whether a scheduled start time for the time-based event is within a threshold period of time, wherein the server is in communication with the user device over a network;
   responsive to determining that the location of the user device associated with the user is within the predetermined geographical distance of the location for the time-based event, and that the scheduled start time for the time-based event is within the threshold period of time, providing, by the server, for presentation on a display of the user device a notification for the time-based event, wherein the notification includes an image showing the location for the time-based event from the perspective of the user at the location of the user device; and
   responsive to determining that the scheduled start time for the time-based event is within the threshold period of time, and that the location of the user device associated with the user is outside the predetermined geographical distance of the location for the time-based event, providing, by the server, for presentation on a display of the user device navigation information for navigating the user to the location for the time-based event.

2. The method of claim 1, wherein the time-based event is a calendar event.

3. The method of claim 1, wherein the notification includes multiple images showing the location for the time-based event, each of the images showing a different view of the location from different perspectives of the user based on the determined location of the user device.

4. The method of claim 1, further comprising:
   responsive to providing the navigation information for navigating the user to the location for the time-based event, determining that the location of the user device associated with the user is within the predetermined geographical distance of the location for the time-based event; and
   providing for presentation on the display of the user device a notification containing an image showing the location for the time-based event from the perspective of the user at the location of the user device.

5. The method of claim 1, wherein the threshold period of time is based on an indicated preference of the user.

6. The method of claim 1, wherein the predetermined geographical distance is based on an indicated preference of the user.

7. The method of claim 1, wherein the notification for the time-based event is in a first format suitable for presentation on the display of the user device, further comprising:
   determining that a reminder control associated with the event has been modified, wherein the modified reminder control specifies a second format for the notification, the second format being different from the first format; and
   responsive to determining that the location of the user device is within the predetermined geographical distance of the location for the event, and that the scheduled start time for the time-based event is within the threshold period of time, providing the notification to the user device in the second format.

8. A system comprising:
   one or more processors; and
   a non-transitory computer-readable medium coupled to said one or more processors having instructions stored thereon that, when executed by said one or more processors, cause said one or more processors to perform operations comprising:
      determining that a time-based event associated with a user includes a location for the time-based event;
      determining a location of a user device associated with the user;
      determining whether the location of the user device associated with the user is within a predetermined geographical distance of the location for the time-based event and whether a scheduled start time for the time-based event is within a threshold period of time;
      responsive to determining that the location of the user device associated with the user is within the predetermined geographical distance of the location for the time-based event, and that the scheduled start time for the time-based event is within the threshold period of time, providing for presentation on a display of the user device a notification for the time-based event, wherein the notification includes an image showing the location for the time-based event from the perspective of the user at the location of the user device; and responsive to determining that the scheduled start time for the time-based event is within the threshold period of time, and that the location of the user device associated with the user is outside the predetermined geographical distance of the location for the time-based event, providing for presentation on a display of the user device navigation information for navigating the user to the location for the time-based event.

9. The system of claim 8, wherein the time-based event is a calendar event.

10. The system of claim 8, wherein the notification includes multiple images showing the location for the time-based event, each of the images showing a different view of the location from different perspectives of the user based on the determined location of the user device.

11. The system of claim 8, wherein the one or more processors are caused to perform further operations comprising:

responsive to providing the navigation information for navigating the user to the location for the time-based event, determining that the location of the user device associated with the user is within the predetermined geographical distance of the location for the time-based event; and providing for presentation on the display of the user device a notification containing an image showing the location for the time-based event from the perspective of the user at the location of the user device.

12. The system of claim 8, wherein the notification for the time-based event is in a first format suitable for presentation on the display of the user device, and wherein the one or more processors are caused to perform further operations comprising:

determining that a reminder control associated with the event has been modified, wherein the modified reminder control specifies a second format for the notification, the second format being different from the first format; and responsive to determining that the location of the user device is within the predetermined geographical distance of the location for the event, and that the scheduled start time for the time-based event is within the threshold period of time, providing the notification to the user device in the second format.

13. The system of claim 8, wherein one or both of the predetermined geographical distance and the threshold period of time is based on an indicated preference of the user.

14. One or more non-transitory computer readable media storing computer-executable instructions that, when executed by one or more processors, causes the one or more processors to perform operations comprising:

determining that a time-based event associated with a user includes a location for the time-based event;

determining a location of a user device associated with the user;

determining whether the location of the user device associated with the user is within a predetermined geographical distance of the location for the time-based event and whether a scheduled start time for the time-based event is within a threshold period of time;

responsive to determining that the location of the user device associated with the user is within the predetermined geographical distance of the location for the time-based event, and that the scheduled start time for the time-based event is within the threshold period of time, providing for presentation on a display of the user device a notification for the time-based event, wherein the notification includes an image showing the location for the time-based event from the perspective of the user at the location of the user device; and responsive to determining that the scheduled start time for the time-based event is within the threshold period of time, and that the location of the user device associated with the user is outside the predetermined geographical distance of the location for the time-based event, providing for presentation on a display of the user device navigation information for navigating the user to the location for the time-based event.

* * * * *